United States Patent
Park et al.

(10) Patent No.: US 8,703,323 B2
(45) Date of Patent: Apr. 22, 2014

(54) SEPARATOR INCLUDING POROUS COATING LAYER AND ELECTROCHEMICAL DEVICE INCLUDING THE SAME

(75) Inventors: Pil-Kyu Park, Daejeon (KR); Jong-Hun Kim, Daejeon (KR); Soon-Ho Ahn, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 13/173,902

(22) Filed: Jun. 30, 2011

(65) Prior Publication Data
US 2011/0256443 A1 Oct. 20, 2011

Related U.S. Application Data

(63) Continuation of application No. PCT/KR2009/007505, filed on Dec. 15, 2009.

(30) Foreign Application Priority Data

Dec. 30, 2008 (KR) ........................ 10-2008-0136592
Dec. 14, 2009 (KR) ........................ 10-2009-0123873

(51) Int. Cl.
*H01M 2/16* (2006.01)
(52) U.S. Cl.
USPC .......................................... 429/145; 429/144
(58) Field of Classification Search
USPC ................................................ 429/144, 145
See application file for complete search history.

(56) References Cited

U.S. PATENT DOCUMENTS

| 6,150,051 A | 11/2000 | Du Pasquier et al. |
| 6,524,738 B1 | 2/2003 | Lee et al. |
| 2006/0008700 A1 | 1/2006 | Yong et al. |
| 2006/0024569 A1 | 2/2006 | Hennige et al. |
| 2007/0099072 A1 | 5/2007 | Hennige et al. |
| 2007/0264577 A1 | 11/2007 | Katayama et al. |
| 2008/0038631 A1 | 2/2008 | Nakura et al. |
| 2010/0015530 A1* | 1/2010 | Katayama et al. ............ 429/246 |

FOREIGN PATENT DOCUMENTS

| EP | 1906471 A1 | 4/2008 |
| JP | 2005-536857 A | 2/2005 |
| JP | 2005-187811 A | 7/2005 |
| JP | 2006164761 A | 6/2006 |
| JP | 2006179432 A * | 7/2006 .............. H01M 2/16 |
| KR | 100590096 B1 | 6/2006 |
| KR | 10-2007-0019958 A | 2/2007 |
| KR | 10-2007-0088514 A | 8/2007 |
| KR | 10-0819825 A | 3/2008 |

(Continued)

*Primary Examiner* — Karie O'Neill Apicella
(74) *Attorney, Agent, or Firm* — Lerner, David, Littenberg, Krumholz & Mentlik, LLP

(57) ABSTRACT

Disclosed is a separator. The separator includes a planar non-woven fabric substrate having a plurality of pores, and a porous coating layer formed on at least one surface of the non-woven fabric substrate. The porous coating layer is composed of a mixture of filler particles and a binder polymer. The filler particles include conductive positive temperature coefficient (PTC) particles composed of a mixture of conductive particles and a low melting point resin having a melting point lower than that of the non-woven fabric substrate. Due to the presence of the conductive PTC particles, the porous coating layer can be imparted with a shutdown function against thermal runaway. In addition, the porous coating layer exhibits appropriate electrical conductivity. Therefore, the separator is suitable for use in a high-capacity electrochemical device.

17 Claims, 2 Drawing Sheets

(56) References Cited

FOREIGN PATENT DOCUMENTS

| KR | 100889207 B1 * | 3/2009 | ............. H01M 2/14 |
| WO | 03065480 A1 | 8/2003 | |
| WO | 2007066768 A1 | 6/2007 | |

* cited by examiner

SEPARATOR INCLUDING POROUS COATING LAYER AND ELECTROCHEMICAL DEVICE INCLUDING THE SAME

CROSS-REFERENCE TO RELATED APPLICATIONS

The present application is a continuation application of International Application No. PCT/KR2009/007505, filed Dec. 15, 2009, published in Korean, which claims priority under 35 U.S.C.§119(a) to Korean Patent Application Nos. 10-2008-0136592 and 10-2009-0123873 filed at the Korean Intellectual Property Office on Dec. 30, 2008 and Dec. 14, 2009, respectively, the entire contents of which are incorporated herein by reference.

TECHNICAL FIELD

The present invention relates to a separator for an electrochemical device, such as a lithium secondary battery, and an electrochemical device including the separator. More specifically, the present invention relates to a separator in which a porous coating layer composed of a mixture of filler particles and a binder polymer is formed on at least one surface of a non-woven fabric substrate and an electrochemical device including the separator.

BACKGROUND ART OF THE INVENTION

Recently, there has been increasing interest in energy storage technologies. As the application fields of energy storage technologies is extending to mobile phones, camcorders, notebook computers and even electric cars, efforts have increasingly been made towards the research and development of electrochemical devices. In particular, secondary batteries capable of repeatedly charging and discharging have attracted considerable attention as the most promising electrochemical devices. In recent years, extensive research and development have been conducted to design new electrodes and batteries for the purpose of improving capacity density and specific energy of the batteries.

Many secondary batteries are currently available. Lithium secondary batteries developed in the early 1990's have drawn particular attention due to their advantages of higher operating voltages and much higher energy densities than conventional aqueous electrolyte-based batteries such as Ni-MH batteries, Ni—Cd batteries, and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. More research urgently needs to be done to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause short circuits between a cathode and an anode.

In order to solve the above safety problems of electrochemical devices, a separator has been suggested in which a mixture of filler particles, such as inorganic particles, and a binder polymer is coated on at least one surface of a highly porous substrate to form a porous coating layer. For example, Korean Unexamined Patent Publication Nos. 2007-83975 and 2007-0019958 and Japanese Patent Publication No. 2005-536857 disclose techniques concerning separators, each of which includes a porous substrate and a porous coating layer formed on the porous substrate wherein the porous coating layer is composed of a mixture of insulating filler particles and a binder polymer and contains a material having a shutdown function.

The insulating porous coating layers formed on the porous substrates contribute to an improvement in the stability of electrochemical devices but inevitably bring about an increase in the thickness of the separators, making it difficult to fabricate high-capacity batteries.

DISCLOSURE OF THE INVENTION

Technical Problem

The present invention is designed to solve the problems of the prior art, and therefore it is an object of the present invention to provide a separator which includes a porous coating layer having a shutdown function and exhibiting appropriate electrical conductivity, thus being suitable for use in a high-capacity electrochemical device.

It is another object of the present invention to provide a high-capacity electrochemical device including the separator.

Technical Solution

In order to achieve these objects, the present invention provides a separator including a planar non-woven fabric substrate having a plurality of pores, and a porous coating layer formed on at least one surface of the non-woven fabric substrate and composed of a mixture of filler particles and a binder polymer, wherein the filler particles include conductive positive temperature coefficient (PTC) particles composed of a mixture of conductive particles and a low melting point resin having a melting point lower than that of the non-woven fabric substrate.

The conductive PTC particles may be present in an amount of 1 to 100% by weight, based on the total weight of the filler particles. Preferably, the filler particles further include inorganic particles.

The non-woven fabric substrate is composed of microfibers having an average diameter of 0.5 to 10 μm and has a pore size distribution in which at least 50% of the pores have a longest diameter of 0.1 to 70 μm, which are preferred in terms of insulation properties of the separator. The porous coating layer is loaded in an amount of 5 to 20 g per square meter ($m^2$) of the non-woven fabric substrate. This loading amount is suitable for the fabrication of a high-capacity battery.

The separator can be interposed between a cathode and an anode to fabricate an electrochemical device such as a lithium secondary battery or a supercapacitor device.

Advantageous Effects

The separator of the present invention has a structure in which a porous coating layer is composed of filler particles including conductive PTC particles with a shutdown function and is formed on a non-woven fabric substrate. Due to this structure, the separator of the present invention offers the following effects.

First, the porous coating layer formed on the insulating non-woven fabric substrate exhibits appropriate electrical conductivity due to the presence of the conductive PTC particles. Therefore, the separator of the present invention is suitable for use in a high-capacity electrochemical device.

Second, a low melting point resin constituting the conductive PTC particles expands when an electrochemical device overheats. This expansion reduces the area of the pores of the porous coating layer and deteriorates the conductivity of the PTC particles, contributing to an improvement in the stability of the electrochemical device. In addition, when thermal runaway occurs in an electrochemical device, the low melting point resin constituting the PTC particles melts and closes the pores of the separator to suppress electrochemical reactions from proceeding further. Furthermore, even when thermal runaway of an electrochemical device causes damage to the non-woven fabric substrate, the presence of inorganic particles in the filler particles can inhibit short circuits between a cathode and an anode of the electrochemical device, thus improving the safety of the electrochemical device.

BRIEF DESCRIPTION OF THE DRAWINGS

Other objects and aspects of the present invention will become apparent from the following description of embodiments with reference to the accompanying drawings in which.

BEST MODE

Figure 1:
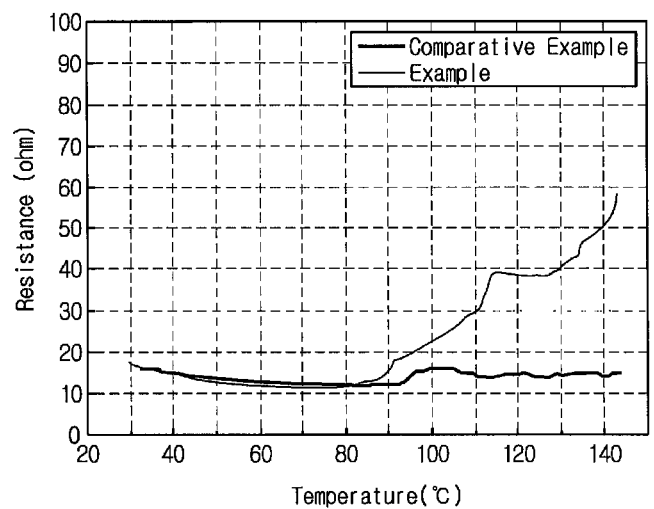
FIG. 1 graphically shows measurement results of the shutdown performance of separators produced in Example 1 and Comparative Example 1.

The present invention will now be described in detail. Prior to the description, it should be understood that terms and words used in the specification and the appended claims are not to be construed as having common and dictionary meanings, but should be interpreted as having meanings and concepts corresponding to technical ideas of the present invention in view of the principle that the inventor can properly define the concepts of the terms and words in order to describe his/her own invention with the best method. Therefore, the embodiments described herein are provided for illustrative purposes only and are not intended to limit the technical scope of the invention. As such, it should be understood that other equivalents and modifications could be made thereto at the time of filing the present application.

Mode For Invention

The present invention provides a separator including a planar non-woven fabric substrate having a plurality of pores, and a porous coating layer formed on at least one surface of the non-woven fabric substrate and composed of a mixture of filler particles and a binder polymer, wherein the filler particles include conductive positive temperature coefficient (PTC) particles composed of a mixture of conductive particles and a low melting point resin having a melting point lower than that of the non-woven fabric substrate.

The so-called "polymer PTC particles" refer to particles prepared by mixing a mixture of resin and conductive particles in appropriate amounts and molding the mixture. Polymer PTC particles are known to exhibit an increase in resistance with increasing temperature (i.e. positive temperature coefficient characteristics) while possessing appropriate conductivity. In a normal state, the conductive particles dispersed in the resin form numerous conductive paths, thus exhibiting a low specific resistance. At elevated temperature, the conductive paths formed by the conductive particles are gradually disconnected because the resin has a higher coefficient of thermal expansion than the conductive particles. As a result, the conductive particles exhibit PTC characteristics.

In the separator of the present invention, the filler particles of the porous coating layer include the conductive PTC particles. Due to the presence of the conductive PTC particles, the porous coating layer formed on the non-woven fabric substrate exhibits appropriate electrical conductivity, making the separator suitable for use in a high-capacity electrochemical device. In addition, overheating of an electrochemical device expands the low melting point resin constituting the conductive PTC particles. This expansion leads to a reduction in the area of the pores of the porous coating layer and deteriorates the conductivity of the PTC particles to suppress electrochemical reactions from proceeding, contributing to an improvement in the stability of the electrochemical device. Particularly, when thermal runaway occurs in an electrochemical device, the low melting point resin constituting the PTC particles melts and closes the pores of the porous coating layer to further suppress electrochemical reactions from proceeding.

The low melting point resin constituting the conductive PTC particles means that the resin has a melting point lower than that of the non-woven fabric substrate. Thus, the low melting point resin melts before the thermal runaway of an electrochemical device causes damage to the non-woven fabric substrate, resulting in shutdown of the separator. There is no particular restriction on the kind of the low melting point resin. A polyolefin resin (e.g., polyethylene or a polyethylene copolymer) having a melting point of 80 to 130° C. is preferred taking into consideration the thermal safety of an electrochemical device.

The conductive particles constituting the conductive PTC particles are not specifically limited so long as they are both electrically conductive and thermally stable. A carbonaceous material, such as natural graphite, artificial graphite, carbon black, graphite or a mixture thereof, is preferred for the conductive particles.

The conductive PTC particles can be prepared by suitable methods known in the art. For example, the conductive PTC particles may be prepared by mixing the conductive particles and the low melting point resin in a weight ratio of 50:50 to 90:10. However, the mixing weight ratio between the conductive particles and the low melting point resin is not limited so long as the functions of the conductive PTC particles can be performed.

The content of the conductive PTC particles in the porous coating layer may be from 1 to 100% by weight, based on the total weight of the filler particles. It is preferred that the filler particles further include inorganic particles. In this case, the content of the inorganic particles is preferably 50% by weight or more, more preferably 70% by weight or more, based on the total weight of the filler particles. The inorganic particles serve to suppress short circuits between a cathode and an anode of an electrochemical device when thermal runaway occurs in the electrochemical device, ensuring safety of the electrochemical device.

The inorganic particles used to form the porous coating layer are not specifically limited so long as they are electrochemically stable. In other words, the inorganic particles can be used without particular limitation in the present invention if they do not undergo oxidation and/or reduction within an operating voltage range of an electrochemical device (for example, 0-5 V for Li/Li$^+$) to which the inorganic particles are to be applied. In particular, a high dielectric constant of the inorganic particles can contribute to an increase in the degree of dissociation of a salt (e.g., a lithium salt) in a liquid electrolyte to improve the ionic conductivity of the electrolyte.

For these reasons, it is preferred that the inorganic particles have a high dielectric constant of at least 5, preferably at least 10. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN—PT), hafnia ($HfO_2$), $SrTiO_3$, $SnO_2$, MgO, NiO, CaO, $ZnO_2$, $ZrO_2$, $Y_2O_3$, $Al_2O_3$, $TiO_2$, and SiC particles. These inorganic particles may be used alone or as a mixture of two or more kinds thereof.

The inorganic particles may be those having the ability to transport lithium ions, that is, those containing lithium atoms and having the ability to transfer lithium ions without storing the lithium. Non-limiting examples of inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O-9Al_2O_3-38TiO_2-39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as $LiI$—$Li_2S$—$P_2S_5$ particles. These inorganic particles may be used alone or as a mixture of two or more kinds thereof.

There is no particular restriction on the average particle diameter of the filler particles such as the conductive PTC particles and the inorganic particles. The average particle diameter of the filler particles is preferably limited to the range of 0.001 to 10 μm. Within this range, a uniform thickness and an optimal porosity of the coating layer can be obtained. An average particle diameter of less than 0.001 μm may cause deterioration of dispersibility. Meanwhile, an average particle diameter exceeding 10 μm may increase the thickness of the porous coating layer and may increase the probability that internal short circuits will be caused during charging and discharging of a battery.

For the binder polymer present in the porous coating layer, a polymer commonly used in the art to form a porous coating layer on a non-woven fabric substrate can be used. The binder polymer preferably has a glass transition temperature ($T_g$) in the range of −200° C. to 200° C. Within this range, the mechanical properties (e.g., flexibility and elasticity) of the porous coating layer can be improved. The binder polymer acts as a binder to stably and fixedly connect between the filler particles or between the filler particles and the non-woven fabric substrate. It is preferred that the binder polymer have better heat resistance than the non-woven fabric substrate and the constituent resin of the PTC particles.

The binder polymer does not necessarily need to have ionic conductivity. However, since the ionic conductivity of the binder polymer can further improve the performance of an electrochemical device, it is preferred that the binder polymer have a dielectric constant as high as possible. In practice, the degree of dissociation of a salt in an electrolyte is dependent on the dielectric constant of a solvent in the electrolyte. Therefore, a higher dielectric constant of the binder polymer can lead to a higher degree of dissociation of a salt in an electrolyte. The dielectric constant of the binder polymer is in the range between 1.0 and 100 (as measured at a frequency of 1 kHz), preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 $Mpa^{1/2}$, more preferably between 15 and 25 $Mpa^{1/2}$ and between 30 and 45 $Mpa^{1/2}$. Accordingly, for the binder polymer, a hydrophilic polymer having many polar groups is preferred over a hydrophobic polymer such as a polyolefin. A solubility parameter less than 15 $Mpa^{1/2}$ or exceeding 45 $Mpa^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, and carboxymethyl cellulose.

The weight ratio between the filler particles and the binder polymer constituting the porous coating layer formed on the non-woven fabric substrate is preferably between 50:50 and 99:1, more preferably between 70:30 and 95:5. The use of the filler particles in an amount less than 50% by weight (i.e. in an amount smaller than that of the binder polymer) may reduce the pore size and porosity of the porous coating layer. Meanwhile, the use of the filler particles in an amount exceeding 99% by weight (i.e. in an amount excessively larger than that of the binder polymer) may deteriorate the peeling resistance of the porous coating layer. The pore size and porosity of the porous coating layer are preferably from 0.001 to 10 μm and from 10 to 90%, respectively, but are particularly limited to these ranges. The pore size and porosity of the porous coating layer are primarily dependent on the size of the filler particles. In the case where the filler particles have a particle diameter of 1 μm or less, pores having a size of about 1 μm or less are formed. Thereafter, an electrolyte injected into the porous structure plays a role in the transport of ions. If the pore size is smaller than 0.001 μm and the porosity is lower than 10%, the porous coating layer may act as a resistance layer. If the pore size is larger than 10 μm and the porosity is higher than 90%, the mechanical properties of the porous coating layer may deteriorate.

The porous coating layer of the separator may further include one or more other additives, in addition to the filler particles and the polymer.

The non-woven fabric substrate of the separator according to the present invention is planar and has a plurality of pores. The non-woven fabric substrate maintains insulation between both electrodes. Microfibers having an average diameter of 0.5 to 10 μm, preferably 1 to 7 μm, are used to produce the non-woven fabric substrate, so that the non-woven fabric substrate has a pore size distribution in which at least 50% of the pores have a longest diameter of 0.1 to 70 μm. A non-woven fabric having a plurality of pores whose longest diameter is smaller than 0.1 μm is difficult to produce, and as a result, its low porosity may partially impede the migration of lithium ions. If the longest diameter of the pores exceeds 70 μm, leakage current may occur, causing insulation deterioration. The use of the non-woven fabric substrate having the pore size distribution defined above makes the separator suitable for use in a high-capacity battery while ensuring good insulation of the separator.

Examples of materials suitable for the microfibers constituting the non-woven fabric substrate include, but are not limited to, polyolefins such as polyethylene and polypropylene, polyesters such as polyethylene terephthalate and polybutylene terephthalate, polyamide such as aramid, polyacetal, polycarbonate, polyimide, polyether ether ketone, polyethersulfone, polyphenylene oxide, polyphenylene sulfide, and polyethylene naphthalate. It is particularly preferred that the microfibers have a melting point of at least 200° C., which is advantageous in terms of thermal safety of the non-woven fabric substrate. Preferably, the non-woven fabric substrate has a thickness of 9 to 30 μm.

The porous coating layer is formed on at least the surface of the non-woven fabric substrate. Taking into consideration the functions of the porous coating layer and the suitability of the porous coating layer for a high-capacity battery, it is preferred that the porous coating layer be loaded in an amount of 5 to 20 g per square meter (m$^2$) of the non-woven fabric substrate.

There is no restriction on the method for producing the separator of the present invention. It is preferred to produce the separator of the present invention in accordance with the following procedure.

First, the binder polymer is dissolved in a solvent to prepare a solution.

Subsequently, the filler particles including the conductive PTC particles are dispersed in the solution of the binder polymer. The solvent preferably has a solubility parameter similar to that of the binder polymer and a low boiling point, which are advantageous for uniform mixing and ease of solvent removal. Non-limiting examples of solvents usable to dissolve the binder polymer include acetone, tetrahydrofuran, methylene chloride, chloroform, dimethylformamide, N-methyl-2-pyrrolidone (NMP), cyclohexane, and water. These solvents may be used alone or as a mixture thereof.

Then, the solution of the binder polymer, in which the filler particles are dispersed, is coated on the non-woven fabric substrate, and dried.

The dispersion can be coated on the non-woven fabric substrate by various techniques well-known in the art, for example, dip coating, die coating, roll coating, comma coating and combinations thereof, to form the porous coating layer. The porous coating layer may form on one or both surfaces of the non-woven fabric substrate. A portion of the porous coating layer may also be present inside the non-woven fabric substrate in view of characteristics of the non-woven fabric substrate.

The separator is interposed between a cathode and an anode to fabricate an electrochemical device. A gellable polymer may be used as the binder polymer. In this case, upon impregnation with a liquid electrolyte after the separator is assembled into a battery, the gellable polymer reacts with the electrolyte and is then gelled.

The present invention also provides an electrochemical device including the separator. The electrochemical device of the present invention includes all devices in which electrochemical reactions occur. Specific examples of such electrochemical devices include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

The separator is applied, together with electrodes, to fabricate the electrochemical device of the present invention. There is no particular restriction on the production method of the electrodes. Each of the electrodes can be produced by binding an electrode active material to an electrode current collector by suitable methods known in the art. The cathode active material may be any of those commonly used in cathodes of conventional electrochemical devices. Non-limiting examples of particularly preferred cathode active materials include lithium manganese oxides, lithium cobalt oxides, lithium nickel oxides, lithium iron oxides and lithium composite oxides thereof. The anode active material may be any of those commonly used in anodes of conventional electrochemical devices. Non-limiting examples of particularly preferred anode active materials include lithium, lithium alloys, and lithium intercalation materials such as carbon, petroleum coke, activated carbon, graphite and other carbonaceous materials. Non-limiting examples of cathode current collectors suitable for use in the electrochemical device of the present invention include aluminum foils, nickel foils, and combinations thereof. Non-limiting examples of anode current collectors suitable for use in the electrochemical device of the present invention include copper foils, gold foils, nickel foils, copper alloy foils, and combinations thereof.

The electrochemical device of the present invention can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ or a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable to dissolve or dissociate the salt include, but are not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during fabrication of the electrochemical device depending on the manufacturing processes and desired physical properties of a final product. In other words, the electrolyte may be injected before the assembly of the battery or in the final step of the battery assembly.

The electrochemical device of the present invention is generally fabricated by winding the separator and the electrodes. Lamination (or staking) and folding of the separator and the electrodes are also possible.

Hereinafter, the present invention will be explained in detail with reference to embodiments. The embodiments of the present invention, however, may take several other forms, and the scope of the invention should not be construed as being limited to the following examples. The embodiments of the present invention are provided to more fully explain the present invention to those having ordinary knowledge in the art to which the present invention pertains.

EXAMPLE 1

Production of Separator

Polyvinylidene fluoride-co-trifluorochloroethylene (PVdF-CTFE) and cyanoethylpullulan were added in a weight ratio of 10:2 to acetone. The mixture was dissolved at 50° C. for at least about 12 hr to prepare a binder polymer solution.

Polyethylene and carbon black particles (1:1, w/w) were homogenized to prepare conductive PTC particles having an average particle diameter of 400 nm.

The conductive PTC particles were mixed with $BaTiO_3$ powder in a weight ratio of 1:9 to prepare filler particles. The filler particles were dispersed in the binder polymer solution to prepare a slurry. The weight ratio of the filler particles to the binder polymer solution was adjusted to 90:10. The slurry was dip-coated on a 12 μm thick polyethylene terephthalate non-woven fabric to form a porous coating layer. The non-woven fabric was composed of microfibers having an average thickness of about 3 μm and had a pore size distribution in which more than 50% of the pores have a longest diameter of less than 70 μm. The porous coating layer was loaded in an amount of about 10 g per square meter ($m^2$) of one surface of the non-woven fabric substrate.

Production of Anode 96 wt % of carbon powder as an anode active material, 3 wt % of polyvinylidene fluoride (PVdF) as a binder and 1 wt % of carbon black as a conductive material were added to N-methyl-2-pyrrolidone (NMP) as a solvent to prepare a slurry. The slurry was applied to a 10 μm thick copper (Cu) foil as an anode collector and dried to produce an anode. The anode was roll-pressed.

Production of Cathode 92 wt % of a lithium cobalt composite oxide as cathode active material, 4 wt % of carbon black as a conductive material and 4 wt % of PVDF as a binder were added to N-methyl-2-pyrrolidone (NMP) as a solvent to prepare a slurry. The slurry was applied to a 20 μm thick aluminum (Al) foil as a cathode collector and dried to produce a cathode. The cathode was roll-pressed.

Fabrication of Battery

The anode, the cathode and the separator were stacked to construct an electrode assembly. An electrolyte consisting of ethylene carbonate (EC)/ethyl methyl carbonate (EMC) (1:2, v/v) and 1 mole of lithium hexafluorophosphate ($LiPF_6$) was injected into the electrode assembly to fabricate a battery.

COMPARATIVE EXAMPLE 1

A separator was produced in the same manner as in Example 1, except that the conductive PTC particles were not used and $BaTiO_3$ powder was only used. Thereafter, the procedure of Example 1 was repeated to fabricate a battery.

Evaluation of Shutdown Performance

The shutdown performance of the separators produced in Example 1 and Comparative Example 1 were measured. The results are shown in FIG. 1.

Specifically, after each of the separators was put into a container, an electrolyte was injected thereinto, followed by sealing. The AC impedance of the separator was measured while heating at a rate of 5° C./min.

FIG. 1 shows that the resistance of the separator of Example 1 was increased with increasing temperature, indicating shutdown performance of the separator. In contrast, no shutdown performance was observed in the separator of Comparative Example 1.

Evaluation of Cell Performance

The cell performance of the batteries fabricated in Example 1 and Comparative Example 1 was measured. The results are shown in FIG. 2.

Figure 2:
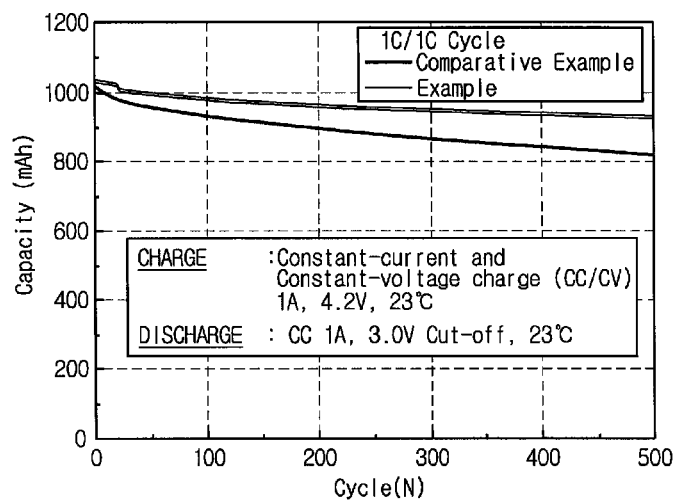
FIG. 2 graphically shows measurement results of the cell performance of batteries produced in Example 1 and Comparative Example 1.

The graph in FIG. 2 confirms that the cell performance of the battery fabricated in Example 1 was superior to that of the battery fabricated in Comparative Example 1.

Safety Evaluation

Each of the batteries fabricated in Example 1 and Comparative Example 1 was subjected to a nail test under the following conditions: voltage=4.2 V, nail diameter=2.5 mm, penetration speed=5 m/min. The results are shown in FIGS. 3 and 4.

Figure 3:
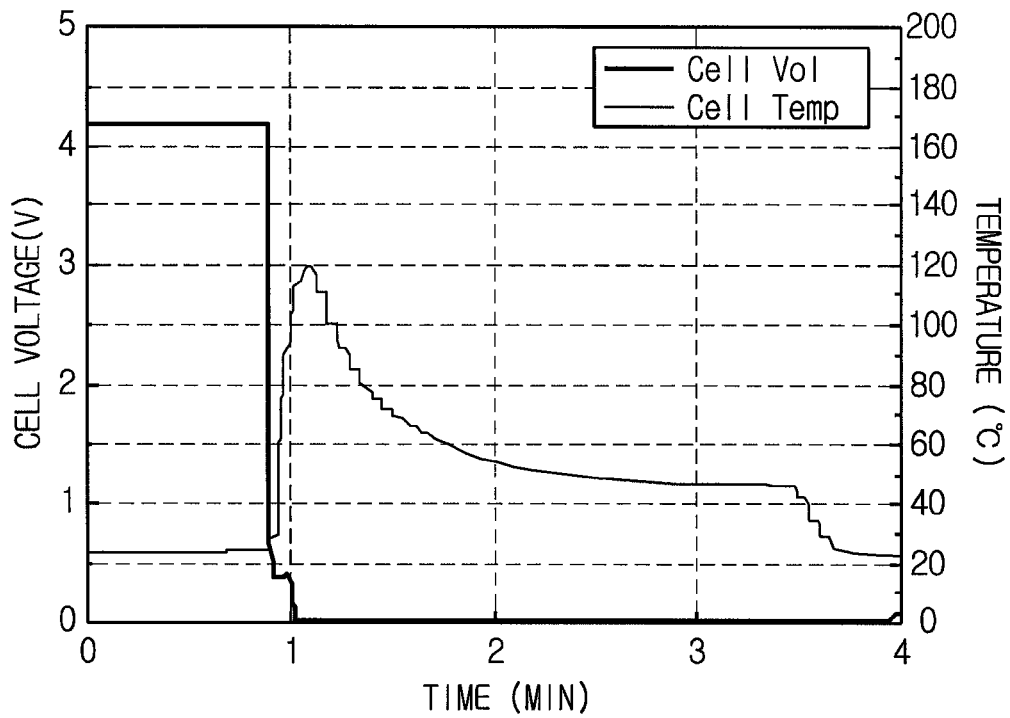
FIG. 3 graphically shows nail test results of a battery produced in Example 1.
Figure 4:
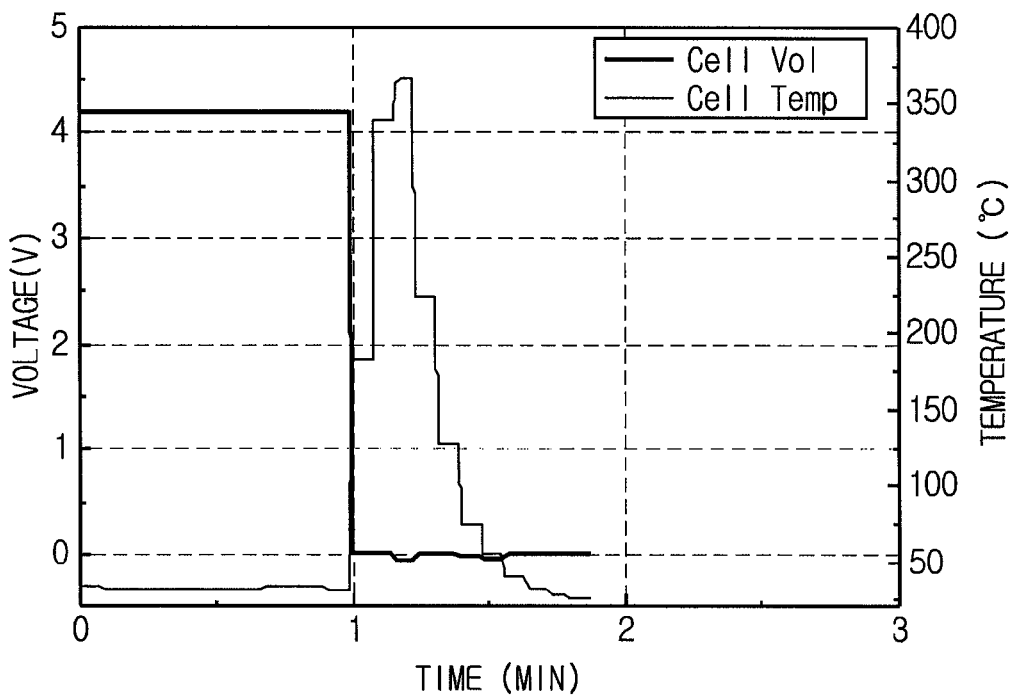
FIG. 4 graphically shows nail test results of a battery produced in Comparative Example 1.

The results of the graphs in FIGS. 3 and 4 shows that the battery of Example 1 passed the safety test, but the battery of Comparative Example 1 failed the safety test.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. A separator comprising a planar non-woven fabric substrate having a plurality of pores, and a porous coating layer formed on at least one surface of the non-woven fabric substrate and composed of a mixture of filler particles and a binder polymer, wherein the filler particles comprise inorganic particles and conductive positive temperature coefficient (PTC) particles composed of a mixture of conductive particles and a low melting point resin having a melting point lower than that of the non-woven fabric substrate, wherein the conductive PTC particles are present in an amount of 1 to 50% by weight, based on the total weight of the filler particles, and wherein the inorganic particles are present in an amount of 50% by weight or more based on the total weight of the filler particles.

2. The separator according to claim 1, wherein the conductive particles are made of at least one carbonaceous material selected from the group consisting of natural graphite, artificial graphite, carbon black and graphite.

3. The separator according to claim 1, wherein the filler particles have an average particle diameter of 0.001 to 10 μm.

4. The separator according to claim 1, wherein the conductive particles and the low melting point resin are present in a weight ratio of 50:50 to 90:10.

5. The separator according to claim 1, wherein the low melting point resin has a melting point of 80 to 130° C.

6. The separator according to claim 1, wherein the low melting point resin is a polyolefin resin.

7. The separator according to claim 1, wherein the weight ratio of the filler particles to the binder polymer is from 50:50 to 99:1.

8. The separator according to claim 1, wherein the binder polymer has a solubility parameter of 15 to 45 $Mpa^{1/2}$.

9. The separator according to claim 1, wherein the binder polymer is selected from the group consisting of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and mixtures thereof.

10. The separator according to claim 1, wherein the non-woven fabric substrate is composed of microfibers having an average diameter of 0.5 to 10 μm.

11. The separator according to claim 10, wherein the microfibers have a melting point of at least 200° C.

12. The separator according to claim 10, wherein the non-woven fabric substrate has a pore size distribution in which at least 50% of the pores have a longest diameter of 0.1 to 70 μm.

13. The separator according to claim 10, wherein the microfibers are composed of at least one polymer selected from the group consisting of polyester, polyacetal, polyamide, polycarbonate, polyimide, polyether ether ketone, polyethersulfone, polyphenylene oxide, polyphenylene sulfide and polyethylene naphthalate.

14. The separator according to claim 1, wherein the non-woven fabric substrate has a thickness of 9 to 30 μm.

15. The separator according to claim 1, wherein the porous coating layer is loaded in an amount of 5 to 20 g per square meter ($m^2$) of the non-woven fabric substrate.

16. An electrochemical device comprising a cathode, an anode and the separator according to claim 1 interposed between the cathode and the anode.

17. The electrochemical device according to claim 16, wherein the electrochemical device is a lithium secondary battery.

* * * * *